Nov. 3, 1964
R. E. ONSTAD ETAL
3,155,560
METHOD OF MAKING A FILTER
Filed Nov. 3, 1958
2 Sheets-Sheet 1
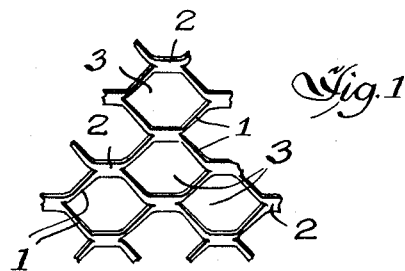
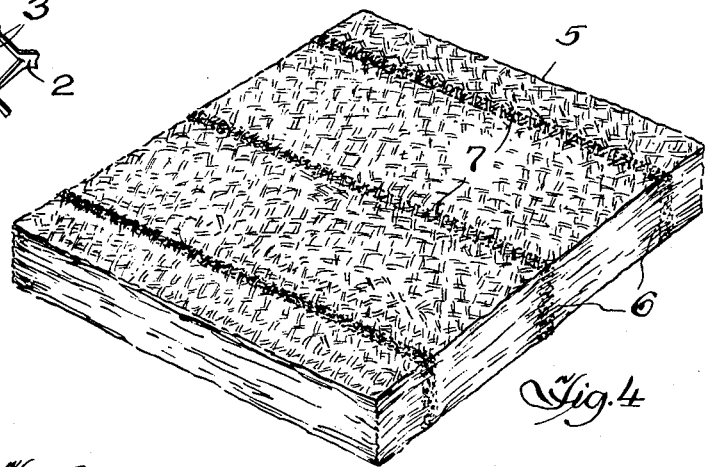
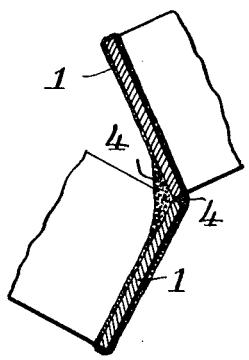
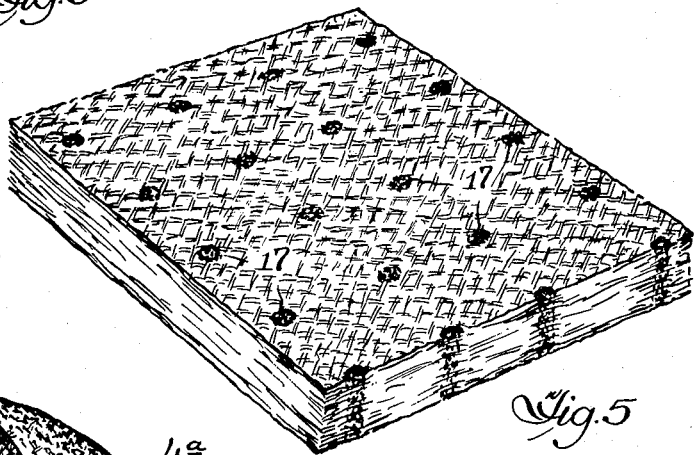
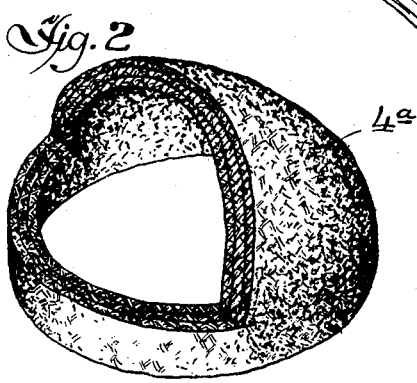
Inventors,
Ragnar E. Onstad,
Milton J. Shoemaker,
Stanley H. Frohmader
and Carl B. Rowe
By: Jones, Darbo & Robertson,
Attys.

Nov. 3, 1964 R. E. ONSTAD ETAL 3,155,560
METHOD OF MAKING A FILTER
Filed Nov. 3, 1958 2 Sheets-Sheet 2
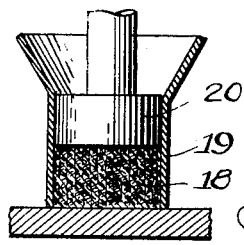
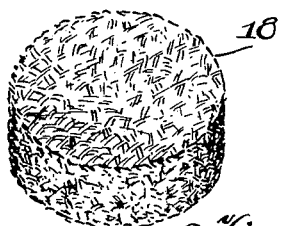
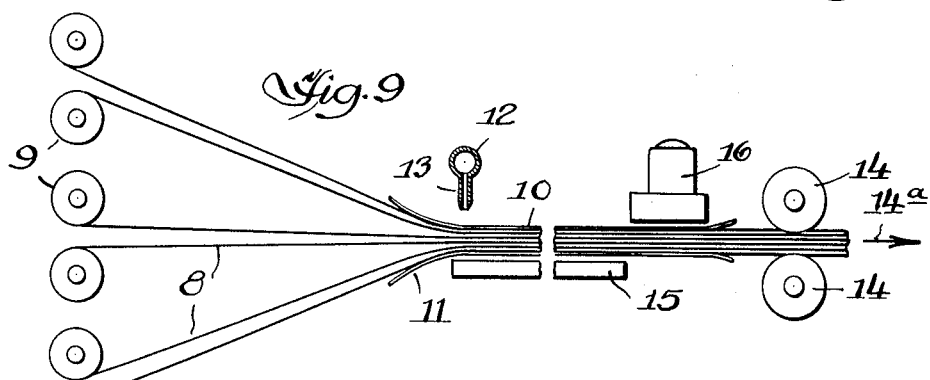
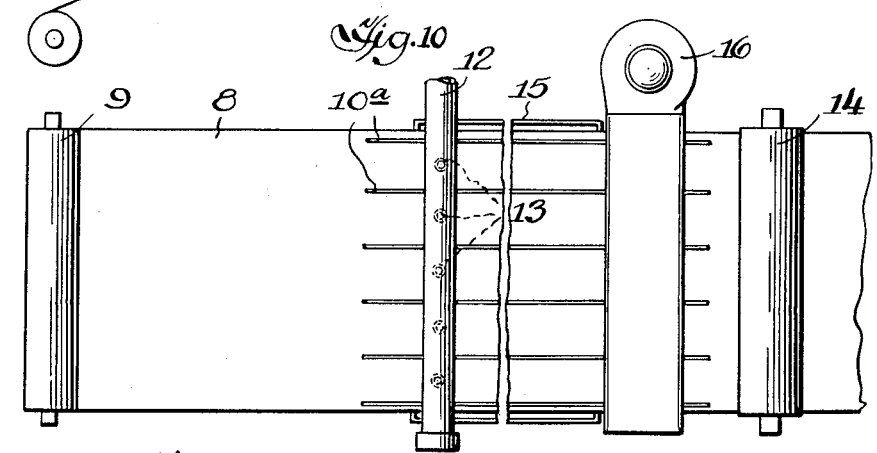
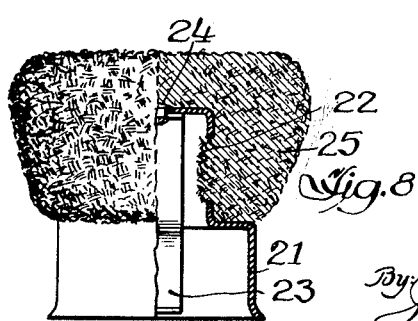
Inventors,
Ragnar E. Onstad,
Milton J. Shoemaker,
Stanley H. Frohmader
and Carl B. Rowe
By Jones, Darbo & Robertson,
Attys.

3,155,560
METHOD OF MAKING A FILTER

Ragnar E. Onstad, Milton J. Shoemaker, Stanley H. Frohmader, and Carl B. Rowe, all of Madison, Wis., assignors to Research Products Corporation, Madison, Wis., a corporation of Wisconsin
Filed Nov. 3, 1958, Ser. No. 771,330
7 Claims. (Cl. 156—222)

This invention relates to filters for fluids and encompasses filters of both the impingement and strainer types, those forms of the filter intended particularly for the filtration of air and other gases operating principally as impingement type filters, while filters intended for the filtration of liquids function as strainers.

This application is a continuation-in-part of our pending application Serial No. 630,591, filed December 26, 1956, now U.S. Patent 3,031,827 for Filter and Method of Making the Same.

All of the filter bodies contemplated by this invention are fabricated from slit and expanded metal foil, especially expanded aluminum foil. Panel filter bodies are built up from the sheets of expanded foil by stacking the desired number of such sheets, or by folding the sheets back and forth or otherwise gathering the desired body of expanded foil. In some forms of the invention, the body so built up is compressed or compacted to reduce the size of openings in the filter body to the desired dimensions, and/or to shape the filter bodies into particular non-planar forms. In all forms of the invention, and in accordance therewith, the filtering body so built up from a sheet or sheets of expanded foil is bonded together by means of a suitable resin or other bonding agent.

The principal object of the invention is to provide improved filters for gases and liquids from expanded metal foil and to reduce the cost of fabrication of such filters. The invention contemplates an improved method of making such filters which makes possible greater flexibility in production procedures and new filter products with physical properties not previously obtainable.

Heretofore, in the production of panel type filters, it has been the common practice to stitch the stacked sheets of expanded foil together by means of sewing machines. This is a relatively expensive manufacturing process and has the further disadvantage of limiting the strength of the filter body for the reason that, unless very expensive special equipment is employed, it is not practical to stitch and sew together expanded aluminum foil in which the foil thickness exceeds about .003 inch. Because of the fragility, limited strength, and especially insufficient stiffness of the sewed expanded aluminum filter bodies, it has been necessary to support the multi-layer filter bodies by frames and/or supporting grids which cover the faces of the filter panels. The invention herein described also makes it possible to eliminate such frames and grids.

Stitching in the final product cannot be tolerated in filter units for certain applications, and it has been necessary in those instances to remove all threads by hand after completion of the unit. This is a tedious and expensive operation. Usually, the sewing serves only a temporary purpose in holding the body together until the frames and/or grids have been applied.

Filters made from expanded metal are of the so-called permanent, rather than the throw-away, type; that is, they are intended to be cleaned, as required, and re-used, rather than to be thrown away when they have become so loaded with dirt that they no longer function properly. Removal, cleaning, and replacement of the filters involves handling which frequently results in more wear and tear than the actual use of the filters. The greater strength achieved by means of the invention has been found to assure no longer useful life of the filter units.

Expanded metal foil filtering media, as well as other types of filtering media, as heretofore made and used, has required the support and protection of some kind of housing structure usually in the form of reinforcing grids and perimeter frames. It is now practical, in accordance with the invention here described, to make strong, rigid bodies of filtering media which may be exposed and handled without undue risk of damage and which, therefore, require no housing.

It is, accordingly, a further object of the invention to provide filter bodies which are physically coherent, rigid, or, if desired, semi-rigid, strong, and self-supporting.

The invention is described by reference to the several forms shown by way of example in the accompanying drawings, in which—

FIG. 1 is a detail view of the expanded metal foil from which all forms of the filter of the invention are fabricated;

FIG. 2 is a perspective view of a rigid domed filter element;

FIG. 3 is a detail view showing the bonding at junctures of adjacent layers of expanded sheet material;

FIG. 4 is a perspective view of a filter panel bonded together at spaced sections;

FIG. 5 is a perspective view of a filter panel bonded together only at spaced points;

FIG. 6 is a perspective view of a filter element formed of compacted metal foil;

FIG. 7 is a sectional view of a die set showing how the element of FIG. 6 may be made;

FIG. 8 is a quarter-sectional view of an automotive breather cap having a filter body formed in accordance with the invention;

FIG. 9 is a diagrammatic illustration showing the manner in which the filters of the invention may be made, and FIG. 10 is a plan view of the diagrammatic illustration of FIG. 9.

Because the physical properties of the filter units made in accordance with the invention depend upon certain physical characteristics of the expanded metal foil which is the basic material from which the filters are fabricated, the expanded foil will be described in some detail although it is a known material which has long been used in the fabrication of filters and other products. Although other metal foils may be used, aluminum foil, and, to a lesser extent, copper foil, have been employed in the manufacture of expanded foil. Both of these metals are relatively non-corrosive in ordinary uses, and the foils are commercially available. Alloys of the metals are used to give products having the desired combination of stiffness and ductility, the particular choice of alloy and thickness of foil depending upon the nature of the final products to be manufactured and the treatment given the metal in the course of the manufacturing process. For the purpose of the invention, the preferred material is aluminum foil (including material sometimes classified as "sheet") having a thickness in the range from .001 inch to .015 inch. For the outer layers of some panel form impingement type air filters, the heavier foil of full hard aluminum alloy is preferred, while a somewhat more malleable alloy in foil thicknesses from .001 to .005 is preferred for the compacted forms of filter body hereinafter described.

As is illustrated in FIG. 1, the expanded foil consists of an open-mesh network of webs 1 which extend between and connect channel-like baffle elements 2. Both the web and channel elements are inclined at an angle to the general plane of the sheet of expanded foil. Webs 1 have considerable curvature or are bent along the lines of junction with the channels 2. It is these curved terminal portions of webs 1 which provide flange-like sides of the channel elements 2, the length of the latter usually being equal to approximately twice the width of the webs. The configuration of the channel elements, particularly the curved flanges extending along the sides thereof, results in a structural strength of surprisingly great magnitude.

A machine for fabricating the expanded metal foil is described in Patent No. 2,611,298. As is therein set forth in greater detail, the dimensional characteristics of the expanded sheet material depend upon the distance between the courses of slits cut in the foil by the machine and the degree of expansion of the slit sheet. The former controls the width of the webs, and the length of the channel elements, the latter the angle of inclination of the channels, within limits, to the general plane of the expanded sheet foil. The thickness of a sheet of expanded material depends upon the length of the channel elements 2 and the angle thereof to the plane of the sheet. The size of the openings 3 depends upon the length of each individual slit and the degree of expansion of the slit foil.

Each layer of expanded metal foil in a stack of such layers being formed into a filter body is continuous throughout its area, that is, all individual web and channel elements are interconnected and held together in the sheet. For this reason, restraint of movement of any part of any sheet necessarily results in the restraint of movement of all parts of that sheet. Also, the layers or stacks of expanded metal foil are capable of holding their shapes against the application of limited forces, and, since the metal is malleable, the layers and stacks may be formed to desired shapes which then have some degree of capability of retaining those shapes, pending, for example, subsequent manufacturing operations. These characteristics of the expanded metal material make possible the improved filter manufacturing methods and products of this invention.

A domed interstitial filter element 4a is illustrated in FIG. 2 as an example of a rigid, self-supporting expanded foil air filter. Filter elements of the impingement type having compound curved surfaces, such as spherical, as distinguished from cylindrical, shapes, have not been readily available heretofore because of the difficulties attendant upon their manufacture. The domed filter 4a is formed by superimposing a desired number of layers of expanded malleable metal foil on top of each other upon a suitable form having the intended surface configuration of the interior of the filter and pressing a mating form upon this assembly to shape the filter body. It may then be removed from the form, being sufficiently coherent and self-sustaining to be handled with the exercise of reasonable care in the subsequent steps of the manufacturing process, or, if desired, the exterior surface may be sprayed with a bonding composition, as hereinafter described, to penetrate the outer layers of expanded foil and rigidify the structure pending completion of the manufacturing process.

It has been discovered that if a substantial number of the individual elements of the expanded material in the body of the filter are cemented or bonded together, the full strength potentialities of the expanded foil and the elements thereof may be realized.

Accordingly, and in the practice of the invention, the built-up body of expanded foil, formed in the manner described, is bonded together and rigidified by means of a suitable bonding agent which may be applied throughout the body of the filter by dipping, spraying, coating on the foil before compacting, vapor condensation, or other technique suited to the particular bonding agent employed. Engaging foil elements, that is, elements which are either in physical contact with each other or close enough to permit bridging of the bonding composition, are either cemented together or enshrouded by the composition to lock the engaging elements together at these points.

As a bonding agent for this and other forms of filter body herein described, one of a number of suitable settable film-forming compositions may be employed. The objective is to firmly join together the several layers of expanded foil at the multiplicity of points of junction of contacting or contiguous portions of filter media within the filter body. This objective requires the deposit of a bonding material at these points of junction. To accomplish this, the formed element 4a may, for example, be dipped into a liquid, such as a lacquer-like solution, comprising a resin dissolved in a suitable solvent, after which the excess liquid is permitted to drain out of the filter body of expanded foil, after which the lacquer remaining on the filter media surfaces is allowed to dry. Preferably, a thin lacquer solution is used so that only sufficient resin to properly bond contacting elements together is incorporated in the filter body. Cost and weight are thus minimized, and resistance to the passage of a fluid through the finished filter is also minimized. If the structure was preliminarily rigidified by spraying the exterior surface, the unit may be completed by spraying the interior with the bonding solution.

Although any of a number of lacquers may be used for the purposes of the invention, a clear solution of a modified alkyd type of resin in a volatile solvent, the resin solids constituting about 15% to 25% by weight, of the solution, or a vinyl copolymer resin applied as a lacquer will give satisfactory results. It has been found that the solution tends to collect at the points of juncture of the expanded foil as the thin lacquer almost completely drains away from the surfaces of the expanded foil material, other than at the points of juncture, so that the resin remaining after the lacquer has dried is largely located only where it is needed, that is, at the foil juncture points. This desirable condition is illustrated in FIG. 3, the resin bond joining two webs 2 together, for example, being deposited as fillets 4. Such joints are remarkably rigid, and being present in great numbers throughout the body of filter element 4a, the entire filter structure is rendered rigid and self-sustaining.

Any of a large number of film-forming compositions may be used as the bonding agent for the filter bodies. An example of an alternative suitable bonding agent is an epoxy resin. The filter body may be dipped in a suitable solution containing the resin and a curing agent, after which the element may be drained and the resin cured by heating. A phenolic resin solution may also be used, if desired, and other suitable bonding agents are available.

Alternatively, to dipping, any of these solutions can be introduced into the filter body 4a by spraying, flowing the solution through the filter body, or by other suitable means.

A wide variety of filter body forms may be made by the method of fabrication thus described, to meet the peculiar needs of a wide variety of filter applications. For example, corrugated units are frequently desirable to furnish a large filtering area with relatively small ingress or egress opening. Such forms are rigid and strong, and may be handled as required without distortion or damage. The dirt removal efficiency of the rigidified filters of the invention is not impaired. Furthermore, and of considerable importance, supporting and protecting housing structures may be dispensed with or furnished in much simpler form when the rigid filter bodies of the invention are used.

Instead of applying the bonding agent to all surfaces of the expanded foil which comprise the filtering body, application may be limited to spaced sections of the filter. Examples of filter panels so constructed are illustrated in FIGS. 4 and 5. These filter bodies are less rigid than the element of FIG. 2, but somewhat stiffer than similar filter panels which are stitched together and not bonded.

Most important, the several layers of expanded foil are held together in the desired shape of filter body.

The several layers of expanded foil which are stacked to form the filter unit 5 shown in FIG. 4 are bonded together at sections 6. The principal purpose of this bonding is to hold the several layers of expanded foil firmly together. The bonding agent may be applied by flowing the bonding material onto the top layer of expanded foil along spaced track 7. If a solution, such as a suitable lacquer as above described, is used, it is applied in sufficient quantity to cause it to flow down through the filter body 5, flowing around and enshrouding the foil surfaces in the sections 6, especially at the points of juncture of the expanded foil elements. The filter body is desirably held together by exteriorly applied pressure, until the lacquer has dried, or the bonding composition otherwise set, in order to hold a large number of contiguous expanded foil elements together and assure permanent bonding at such points of juncture.

The strip bonded product shown in FIG. 4 may be sufficiently securely held together to be useful as a filter when installed in the cells of a filter bank, for example, or the strip bonding illustrated in this figure of the drawing may be employed as a temporary expedient to hold the body together until a suitable frame can be applied to it as shown, for example, in Patent No. 2,754,928. The distance between bonded sections 6, that is, the number of such bond sections for a given width of filter body, will depend upon the degree and permanency of bonding required.

One method of making the strip bonded filter element 5 is suggested in the diagrammatic illustrations of FIGS. 9 and 10. In this arrangement, the desired number of layers 8 of expanded foil are fed from supply rolls 9 between guide grids 10 and 11. These guide grids are composed of spaced runners, such as 10a, the space between the upper and lower grid being sufficient to accommodate the body of filtering media thus formed, but small enough to exert light pressure against the top and bottom surfaces of the stack to maintain contact between adjacent layers. A suitable bonding agent, such as the lacquer solution above described, is supplied by pipe 12 to a series of spaced nozzles 13. Power driven rolls 14 draw the body of expanded material continuously, in the direction indicated by the arrow through the grid apparatus, and the bonding agent, flowing continuously from nozzles 13, is laid onto the top layer 8 of expanded foil and flows down through the several layers, excess solution draining into the drip pan 15 arranged under the grid 11. A fan, or other suitable source of drying air 16, forces a blast of air downwardly through the media to evaporate the solvent and deposit the resin as a bonding agent in the body of the media. Grids 10 and 11 hold the body together until after the lacquer has been completely dried. Following the rolls 15, the filter blanket thus formed may be slit and cross cut to the desired sizes of filter panels.

Some economy in the amount of bonding agent used may be effected by using a spot pattern, as shown in FIG. 5, instead of the strip pattern as illustrated in FIG. 4. This form of filter element may be made on apparatus similar to that illustrated in FIGS. 9 and 10, suitable valve mechanism being provided to feed the bonding agent to the gathered media in spaced blobs 17 instead of continuously, as in tracks 7.

As an alternative method to that of applying the adhesive subsequent to stacking the layers of expanded foil on one another to form a pack, the adhesive may be applied prior to the stacking operation by any suitable method. For example, a continuous layer of expanded foil is passed through a dip tank containing the adhesive in liquid form. The adhesive may be a thermoplastic material which is maintained in a liquid state by heat, a composition maintained in the liquid state in a solvent, or a thermo-setting liquid adhesive in the uncured state.

After excess adhesive has been removed, such as by shaking or by blowing air therethrough, the adhesive may be allowed to set or harden by an appropriate method. Where it is so desired, the adhesive may be allowed to remain in the liquid or soft state until the stack is assembled. A plurality of layers of expanded foil are then stacked one upon the other and passed through a heating zone where the adhesive melts and distributes itself about the contact points between the sheet. After the stacked layers, while held together under moderate pressure, are cooled and the adhesive is set a strong rigid filter pack results.

As an alternative method, a thin solid integral film of a thermoplastic adhesive or a thermosetting adhesive in the uncured state may be placed between the severed layers of expanded foil, and the multilayer stacks then passed through a heating zone. The adhesive is there melted and tends to distribute itself about the contact points between one sheet and another, and forming openings between the areas of contact for the normal passage of air therethrough. The adhesive is allowed to cool, preferably while a light pressure is applied to hold the layers in intimate contact. Because when the adhesive melts it becomes concentrated at the contact junctions where it is most needed, less adhesive will be needed, and as a result the above described methods provide inexpensive means of providing a strong adhesion between the various layers.

As a further alternative, the individual expanded foil sheets may be passed between coating rollers where only a thin layer of adhesive is coated upon the edges of the individual baffle elements which comprise the expanded material. It is preferable that a soft, resilient roller be used for the coating process in order to insure that even those edges which are not in the plane formed by the majority of baffles will still be coated with the adhesive. The coated foil is then cut into pads, superimposed upon each other to form a stack and then cured as described above. In this particular process, a minimum amount of adhesive material is used, the broader surfaces of the baffle elements of the expanded foil being uncoated.

During the time that the adhesive is drying or is being cured, a moderate amount of pressure may advantageously be applied against the top layer in order that intimate contact be established between a larger number of edges of the baffles of each sheet and its contiguous sheet, since all edges are not at exactly the same level. In some cases the edges of two contiguous sheets may cut into one another under pressure, providing stronger joints therebetween.

The apparatus of FIGS. 9 and 10 may also be used for the overall bonding of the expanded foil filtering media by substituting suitable spray heads for nozzles 13. Also, a thermoplastic resin may be fed from nozzles 13 in strips 7 or blobs 17, as the case may be, after which the expanded foil material may be passed through a warming oven to liquify the plastic material so that it will readily flow down through the body of expanded foil. The air blast then serves to cool and harden the resin.

Examples of completely self-sustaining filter elements are illustrated in FIGS. 6 and 8. The strength of these elements result from two factors, one being the initial compaction of the expanded foil body to inter-engage the elements of the layers of expanded foil throughout the entire filter body, the other factor being the stiffening of the entire structure by means of a bonding agent which locks the foil together at each point of juncture of the compacted foil elements. The disc-shaped filter element 18 is formed by gathering together sufficient expanded aluminum foil to provide a bulk of two to three times that of the finished filter 18. This loosely gathered material is placed in female die 19 and punch 20 is forced downwardly to compress or compact the foil in the die cavity. This operation crushes the expanded foil web and channel elements, buckling and folding them into inter-engagement with other elements to form a compacted mass having interstices which are very much smaller than the openings in the expanded foil material from which the filter element 18 was fabricated. The fineness of the passageways provided in the filter body depends upon the particular filtering application in which the element is to be used, and this physical characteristic can be controlled by the degree of compaction of the mass of expanded foil and by the thickness of the film of bonding material.

The filter element 18, thus formed by compacting the expanded foil, is then treated with a bonding agent to further strengthen and rigidify the structure. For this purpose, the element may be dipped in a thin lacquer solution, drained, preferably in an atmosphere of the solvent, and the remaining lacquer dried. If the body has been compacted to such an extent that the intercommunicating openings are very small, it may be desirable to force the lacquer through the filter body and thereafter remove the excess and dry the bonding lacquer by blowing air through the element. Also, if the filter openings of the compacted body are very small, it may be desirable to remove excess lacquer by centrifuging.

Filter forms made in this manner by compacting expanded aluminum foil and internally bonding the structure, as described, exhibit surprising compressive strength. For example, a right cylinder, two inches in diameter and one and one-quarter inch long, was formed from expanded aluminum foil .003 inch thick by compacting the expanded material in a die under gentle pressure, as described, to a density of ten and one-half pounds per cubic foot. This compacted foil unit was then dipped into a resin solution, drained, dried at 90° C. and heated for 15 minutes at approximately 190° C. Although the resulting product had a density of only 18 pounds per cubic foot, the application of a pressure of 56 pounds per square inch in an axial direction resulted in no noticeable distortion.

The automotive breather cap illustrated in FIG. 8 is a further example of a compacted expanded metal foil filter product which has been rigidified by treatment with a bonding agent. In this device, a drawn sheet metal cap 21, which will become the permanent filter supporting and mounting means, has at least one opening 22 in the interiorly seated upper portion of the cap. The inside diameter of the lower portion of cap 21 is such that this portion will slide onto the open end of the crank case filler tube. A pair of leaf springs 23, adapted to slide into the interior of the filler tube and hold the cap in position, are provided by riveting, as at 24, a two-legged spring steel clip to the top of the cap. A body 25 of compacted expanded aluminum foil may either be molded directly upon the upper portion of the cap 21 surrounding opening or openings 22, or this body may be separately formed and thereafter assembled upon the sheet metal cap structure. In either case, the filter body 25 is either dipped or otherwise treated with one of the bonding agents above described, either before or after application of the compacted body to the cap structure.

Filter body 25, while sufficiently porous to permit gases to move freely in and out therethrough, is sufficiently strong and coherent to serve as a knob which may be grasped by the hand to remove or replace the breather cap upon the crank case filler tube. No separate housing structure is necessary.

It will be appreciated that great savings may be realized in the manufacture of a wide variety of filter products by reason of the physical properties of the filter media formed by compacting and further strengthening the expanded metal foil body, as exemplified by the automotive breather cap of FIG. 8. Housings may be dispensed with, and assembly costs, in addition to material costs, may be substantially reduced. With elimination of housing structure, filter ingress area may frequently be greatly increased to prolong the periods of useful operation of the filter before cleaning or replacement becomes necessary. Additionally, the filter bodies are easily accessible, being exposed for the convenient cleaning of the bodies, as by swishing the body in an appropriate solvent. Thus, not only are savings effected in the manufacturing cost of the products, including filter mounting apparatus, but service expense is reduced and the useful life of the filter greatly lengthened.

As has been suggested in the foregoing description of the invention, many variants of the method and products of the invention may be practiced, and it is neither necessary nor feasible to describe all such modified forms of the invention herein. In all forms of filter bodies constructed in accordance with the invention, the peculiar structural characteristics of the expanded metal foil, including the miniature channels interconnected by the web elements, which individually display substantial strength against compression in a direction lengthwise of the channel elements, are harnessed by the bonding agent to provide finished filter bodies of surprising strength and rigidity. In the compacted state of the expanded metal foil filter bodies, the foil elements are brought closer together and the number of curved sections is increased with resulting increase in the strength of the body. While compression of a given mass of expanded metal foil into a smaller volume increases the strength of the body, bonding of contact points makes it possible to achieve the desired strength without unduly compacting, and thus unduly restricting the flow of fluid through, the filter. The formed filter elements of this invention which may be produced by compressing the slit and expanded foil make possible the fabrication of curved sections and intricate patterns which may be converted into tough, durable foraminous filter bodies by bonding together the contacting areas of the foil.

We claim:

1. A method for making a rigid filter comprising the steps of stacking a plurality of layers of expanded malleable metal foil, applying a settable liquid bonding composition to the stack and distributing the composition throughout the thickness thereof, applying a moderate pressure to said stack to increase the number of points of engagement of adjacent layers, and causing said composition to set while said stack is so pressed together to bond engaging elements of said expanded metal foil layers together.

2. A method in accordance with claim 1 wherein the bonding composition is applied to the top surface of the stack in sufficient quantity to flow down through said stack and engage at least a portion of each layer.

3. A method in accordance with claim 2 wherein the bonding composition is applied to only spaced portions of the top surface of said stack whereby bonding together of the layers is limited to those portions of the stack which underlie said portions of the top surface thereof.

4. A method for making a rigid flat filter comprising the steps of assembling a flat stack of superposed flat layers of expanded malleable metal foil, dipping said stack in a bath of bonding composition, permitting the excess of bonding composition to drain away from said stack, and applying a moderate compressive pressure to said flat stack to effect engagement of a multiplicity of elements of adjoining layers of expanded foil and causing said composition to set while said stack is being held together by externally applied moderate pressure to bond engaging elements of said expanded foil together and thus to bond said stack into a coherent rigid filter body.

5. A method for making a rigid filter comprising the steps of arranging a plurality of layers of expanded malleable metal foil upon a form, pressing a mating form upon the assembly of layers to shape said assembly and effect interengagement of a multiplicity of elements of said foil, and thereafter applying a settable bonding composition to the shaped assembly to bond together all interengaging elements thereof and causing said composition to set to form a rigid self-supporting filter.

6. A method for making a rigid filter from expanded metal foil comprising the steps of gathering a body of expanded malleable metal foil sufficient to form such filter, compacting and molding said body to the desired shape, filling said shaped body with a liquid settable bonding composition, draining said composition from said body, and causing the composition retained in said body to set to form a rigid self-supporting filter.

7. A method of making a rigid filter having a filter supporting and mounting element permanently affixed thereto comprising the steps of arranging a mass of expanded malleable metal foil upon a filter supporting and mounting element, pressing a form upon the mass of foil to compact and shape said mass to form a filter body, and thereafter applying a settable bonding composition to the filter body and causing said composition to set to bond together all interengaging elements of the compacted expanded foil to form a rigid self-supporting filter unit permanently affixed to said filtering and mounting element.

References Cited in the file of this patent
UNITED STATES PATENTS

| | | |
|---|---|---|
| 1,321,410 | Ackers | Nov. 11, 1919 |
| 2,070,073 | Walton | Feb. 9, 1937 |
| 2,463,722 | Spraragen | Mar. 8, 1949 |
| 2,656,291 | Doll et al. | Oct. 20, 1953 |
| 2,697,679 | Zimarik | Dec. 21, 1954 |
| 2,747,701 | Newell | May 29, 1956 |
| 2,829,733 | Bartels et al. | Apr. 8, 1958 |
| 2,860,740 | Holland et al. | Nov. 18, 1958 |

UNITED STATES PATENT OFFICE
CERTIFICATE OF CORRECTION

Patent No. 3,155,560                            November 3, 1964

Ragnar E. Onstad et al.

It is hereby certified that error appears in the above numbered patent requiring correction and that the said Letters Patent should read as corrected below.

Column 1, line 22, after "Panel" insert -- type --; column 2, line 2, for "assure no longer" read -- assure longer --; column 6, line 11, after "set" insert a comma.

Signed and sealed this 6th day of April 1965.

(SEAL)
Attest:

ERNEST W. SWIDER                          EDWARD J. BRENNER
Attesting Officer                            Commissioner of Patents